(12) United States Patent
Broumandan

(10) Patent No.: US 11,391,847 B2
(45) Date of Patent: Jul. 19, 2022

(54) GNSS CORRELATION DISTORTION DETECTION AND MITIGATION

(71) Applicant: NovAtel Inc., Calgary (CA)

(72) Inventor: Ali Broumandan, Calgary (CA)

(73) Assignee: NovAtel Inc., Calgary (CA)

( * ) Notice: Subject to any disclaimer, the term of this patent is extended or adjusted under 35 U.S.C. 154(b) by 181 days.

(21) Appl. No.: 16/799,128

(22) Filed: Feb. 24, 2020

(65) Prior Publication Data

US 2021/0263161 A1 Aug. 26, 2021

(51) Int. Cl.
*G01S 19/22* (2010.01)

(52) U.S. Cl.
CPC .................. *G01S 19/22* (2013.01)

(58) Field of Classification Search
CPC ......... G01S 19/22; G01S 19/428; G01S 19/37
See application file for complete search history.

(56) References Cited

U.S. PATENT DOCUMENTS

| | | | |
|---|---|---|---|
| 5,101,416 A | 3/1992 | Fenton et al. | |
| 5,390,207 A | 2/1995 | Fenton et al. | |
| 5,402,450 A * | 3/1995 | Lennen | G01S 19/22 375/343 |
| 5,495,499 A | 2/1996 | Fenton et al. | |
| 5,963,582 A | 10/1999 | Stansell, Jr. | |
| 6,002,728 A | 12/1999 | Blois | |
| 6,243,409 B1 | 6/2001 | Fenton et al. | |
| 6,687,316 B1 | 2/2004 | McGraw | |
| 2006/0215739 A1 | 9/2006 | Williamson et al. | |
| 2007/0058700 A1 | 3/2007 | Fenton | |
| 2007/0064776 A1 | 3/2007 | Feller et al. | |
| 2007/0211793 A1 | 9/2007 | Han | |
| 2017/0170854 A1 | 6/2017 | Soualle | |
| 2021/0325545 A1 | 10/2021 | Broumandan | |

FOREIGN PATENT DOCUMENTS

| | | |
|---|---|---|
| EP | 0892277 | 1/1999 |
| WO | WO 2015041566 | 3/2015 |

OTHER PUBLICATIONS

"European Search Report and Written Opinion," European Application No. 21158606.0-1206, Applicant: NovAtel Inc., dated Jun. 23, 2021, pp. 1-11.

Pirsiavash et al. "Characterization of Signal Quality Monitoring Techniques for Multipath Detection in GNSS Applications," *Sensors* 2017, 17, 1579; doi:10.3390/s17071579, 24 pages.

(Continued)

*Primary Examiner* — Cassi J Galt
(74) *Attorney, Agent, or Firm* — Cesari and McKenna, LLP

(57) ABSTRACT

Structures and techniques are disclosed that can be used to reduce or remove code multipath error in GNSS receivers by implementing one or more monitoring correlators in a multipath-error estimation and correction (MEC) module. The MEC module detects and provides for correction of correlation peak distortion. In exemplary embodiments, a code tracking loop integrates all-chip-edges of a PRN, and a narrow-correlator is used to update the tracking loop rate while a multipath estimation module implements a blanked correlator to estimate and remove the multipath bias from the code tracking loop measurements.

20 Claims, 6 Drawing Sheets

(56) References Cited

OTHER PUBLICATIONS

Estey et al., "Teqc Tutorial—Basics of Teqc Use and Teqc Products," UNAVACO, Boulder, CO, Jun. 6, 2014, 61 pages.
Bui et al., "GPS-Bades Indoor/Outdoor Detection Scheme Using Machine Learning Techniques," *Appl. Sci.*, 2020, 10, 500; doi:10.3390/app10020500, 19 pages.
Fenton, et al., "The Theory and Performance of NovAtel Inc.'s Vision Correlator," ION GNSS 2005 Long Beach, CA, 9 pages.
Herberger "Real-Time Software Defined GPS Receiver" Master of Science in Engineering Thesis submitted Aug. 2013 to Purdue University, 167 pages.
Jan Van Sickle, Tracking Loops, GEOG 862: GPS and GNSS for Geospatial Professionals, Pennsylvania State University, 2018, retrieved from the Internet Jan. 28, 2020, https://www.e-education.psu.edu/geog862/node/1785, 6 pages.
Khaing et al., "Implementation of Code and Carrier Tracking Loops for Software GPS Receivers," International Journal of Scientific & Technology Research vol. 4, Issue 06, Jun. 2015, 7 pages.
Gunawardena et al., "Chip Transition-Edge Based Signal Tracking for Ultra-Precise GNSS Monitoring Applications," Proceedings of the ION 2015 Pacific PNT Meeting, Apr. 20-23, 2015, Honolulu, HI, pp. 100-106.
Gunawardena et al., "Chip Transition-Edge Based Signal Tracking for Ultra-Precise GNSS Monitoring Applications," *A Satellite with Personality*, by GPS World, Aug. 7, 2015, 12 pages.
Reed, Rachel E., "Real-Time Implementation and Analysis of Chip Shaped-Based Software Defined Receiver," Master of Science in Electrical Engineering Thesis submitted May 2017 to University of Dayton, 80 pages.
Phelts, Robert Eric, "Multicorrelator Techniques for Robust Mitigation of Threats to GPS Signal Quality," Doctor of Philosophy Thesis submitted Jun. 2001 to Stanford University, 345 pages.
M. Irsigler et al., "Comparison of Multipath Mitigation Techniques with Consideration of Future Signal Structures", Institute of Geodesy and Navigation, University FAF Munich, Germany, ION GPS 2003, Portland, Oregon, 13 pages.
McGraw, Gary A., Braasch, Michael S., "GNSS Multipath Mitigation Using Gated and High Resolution Correlator Concepts," *Proceedings of the 1999 National Technical Meeting of The Institute of Navigation*, San Diego, CA, Jan. 1999, pp. 333-342.
European Search Report dated Sep. 20, 2021 for European Patent Application No. 21169470.8 for NovAtel Inc., 9 pages.

* cited by examiner

GNSS CORRELATION DISTORTION DETECTION AND MITIGATION

BACKGROUND

Technical Field

This disclosure relates to addressing correlation peak distortion caused by multipath interference on global navigation satellite system (GNSS) signals.

Description of Related Art

Global navigation satellite systems (GNSS) are increasingly used to precisely determine a position, with GPS, GLONASS, and Galileo being three particularly well-known examples. To accomplish position determination, such systems utilize receivers that decode several precisely-timed signals transmitted by a group of satellites deployed for the respective systems. By using one of these receivers, a user can determine his or her position, e.g., relative to the Earth-Centered Earth-Fixed coordinate system, as a result of the receiver measuring its range to at least four satellites, which have positions accurately determined by the respective GNSS system.

A GNSS receiver determines its global position based on the signals it receives from orbiting GPS, GLONASS, Galileo, BeiDou or other satellites. Using GPS as an example, its satellites transmit signals on RF sinusoidal carrier frequencies called, L1 and L2 (from inception) and L1C, L2C, and L5 (later added). All GPS satellites transmit at the same frequencies. The carriers are modulated by ranging codes, which are pseudo-random (PRN) spreading codes consisting of a seemingly random sequence of 1's and 0's that periodically repeat. The 1's and 0's in the PRN code are referred to as "code chips," and the transitions in the code from 1 to 0 or 0 to 1, which occur at "code chip times," are referred to as "bit transitions". A unique PRN is selected for transmission by each GPS satellite, identifying that satellite to all GPS receivers. The GPS satellite signals also include navigational data, which is a binary-coded message consisting of data on the satellite health status, ephemeris (i.e., satellite position and velocity), clock bias parameters, and an almanac giving reduced-precision ephemeris data on all satellites in the constellation.

A typical GNSS receiver thus receives a composite signal consisting of several signals transmitted by the satellites, as well as any noise and interfering signals. A decoder or channel circuit may then recover one of the transmitted signals by correlating the composite received signal with a locally generated reference version of the PRN code signal assigned to the satellite of interest. If the locally generated PRN reference signal is properly timed, the digital data from that satellite may then be properly detected.

The signals received from different satellites are also automatically separated by the correlation process, because the signals transmitted by different satellites use unique PRN codes having low cross-correlation power. The three-dimensional position of the receiver and its velocity may then be resolved by using the PRN code phase information to precisely determine the transmission time from at least four satellites, and by detecting each satellite's ephemeris and time of day data.

A GNSS receiver performs signal tracking by synchronizing local replicas of the carrier and PRN codes of the satellite to be tracked with the incoming carrier and PRN codes from that satellite. This means that the receiver must have the ability to generate the PRN codes of all the satellites. Signal tracking is achieved by continuously modifying the phase and frequency of the carrier replica and delaying or advancing the code replica in order to maintain them synchronized with the incoming signal.

Carrier tracking is typically accomplished in a phase lock loop (PLL), while code tracking is performed by a delay lock loop (DLL). When synchronization is achieved, the phase of the carrier replica is the same as the incoming carrier phase, and the delay that had to be applied to the code replica is the same as that of the incoming code. The range measurement by a GNSS receiver is based on the measurement of that delay, which is directly related to the signal travel time from the satellite to the receiver. By multiplying the delay by the speed of light, the receiver computes its range to the satellite; this range computation is an estimate that is commonly referred to as a "pseudorange."

In order to correctly determine the offset of the PRN reference signal, its relative time delay is typically varied relative to PRN of the incoming signal until a maximum power level in the resulting correlation signal is determined. At the time-offset corresponding to this point of maximum received power, the local reference signal is synchronized with the incoming signal, and the range measurement may then be made. A delay lock loop (DLL) tracking system performs these operations to maintain PRN code lock for each channel by correlating early (E), punctual (P), and late (L) versions of the locally generated PRN code signal against the received composite signal.

Several error sources influence the accuracy of the satellite range measurement. They include, but are not limited to, satellite orbit prediction, satellite clock drift, ionospheric delay, tropospheric delay, receiver clock offset, and multipath error.

Multipath is a special type of interference where the received signal is composed of the desired line-of-sight signal, and one or more constituents which have traversed slightly different paths due to reflections on surfaces or objects in the antenna surroundings. Multipath signals arrive at the receiver with a different delay, phase, and power than the line-of-sight signal. The ranging error due to multipath depends on the delay, phase, and power of the multipath signal with respect to the line-of-sight signal, and on the type of signal processing the receiver uses. FIG. 1 depicts a representative multipath scenario 100 for a GNSS receiver.

As shown in FIG. 1, a GNSS receiver 102 receives signals from a GNSS satellite 104, which has transmitted signals over a broad area. In addition to a line of sight (LOS) signal 1, the receiver also receives multipath signals 2 that have been reflected off nearby manmade structures, e.g., buildings 106, and natural surfaces, e.g., lake 108. The multipath signals 2 are received with the LOS signal 1 at the receiver 102.

The effect of the presence of multipath on the process of a GNSS receiver acquiring code lock is that there will always be some correlation with the multipath signals as well as with the desired, direct (LOS) path signal. FIGS. 2A-2B depict direct path, multipath, and resulting correlation functions for in-phase and out-of-phase scenarios 200A-200B, respectively. In FIGS. 2A-2B, the independent axis represents time (in microseconds) while the dependent axis represents normalized amplitude (measured amplitude normalized by the peak amplitude). In both the cases shown in FIGS. 2A and 2B, it may be observed that the resulting correlation function is skewed and non-symmetric. Another key observation is that the slopes of the function on either side of the peak are not equal In the presence of multipath distortion, most GNSS receivers suffer a degradation in accuracy. This presents a particularly significant problem in high-accuracy differential GNSS applications, where multipath commonly results in errors creeping into the differential corrections, causing large position biases. Unlike other error sources, multipath is typically uncorrelated between antenna locations. Thus, the base and remote receivers experience different multipath interference and as a result, simple differencing between them will not cancel the errors due to multipath distortion.

A common method of reducing multipath is to carefully choose the design of the antenna and careful site selection. Unfortunately, it is often not possible to change either of these parameters. For example, if the antenna is to be mounted on an airplane fuselage, it will not be easily moved or replaced, and its shape is excessively restricted due to aerodynamic considerations.

Multipath affects both carrier and code measurements. The error in code phase (pseudorange) measurements is a function of the method used to track GNSS signals. In general, higher bandwidth results in better multipath mitigation performance. In the case of correlator-based code tracking methods, the multipath mitigation performance becomes a function of the correlator spacing. So-called Early-Late (E-L) methods, which are sometimes referred to as Early-Minus-Late (EML), form a general class of correlator-based methods, with the Narrow Correlator (NC) and Pulse Aperture Correlator (PAC) (also referred to as a "double delta" correlator) being well-known examples. The use of the "narrow correlators" is discussed in U.S. Pat. Nos. 5,101,416; 5,390,207 and 5,495,499, all of which are assigned to the applicant of the present disclosure and incorporated herein by reference in their entireties.

FIG. 3 depicts a graph 300 of a correlation function including correlator layouts for Narrow correlator using E2-L2 correlators, Narrow correlator using E1-L1 correlators, and Pulse Aperture Correlator (PAC) techniques.

To calculate the code error for the Narrow Correlator and PAC techniques, the following discriminators are commonly used:

$$Narrow1 = \frac{E1 - L1}{2} \quad (EQ.\ 1)$$

$$Narrow2 = \frac{E2 - L2}{2} \quad (EQ.\ 2)$$

$$Narrow\ PAC = \frac{2(E1 - L1) - (E2 - L2)}{2} \quad (EQ.\ 3)$$

Such correlator-based discriminators are designed based on the symmetric assumption of the correlation peak. If the early and late correlators (at each side of the correlation function peak) have the same power the punctual correlator (also referred to as the "prompt" correlator) is located on the correlation peak, meaning the incoming signal is perfectly synchronized ("synced") with the replica code generated by the receiver. This assumption is not always valid, however. Depending on the front-end filter and other transmitter and receiver hardware limitations, the shape of the correlation peak in the absence of multipath may not necessarily be the ideal triangular shape and calibration may be required. However, when all the PRNs are affected by the same amount (usually in the case of CDMA) this issue does not severely affect the position and velocity solutions.

FIG. 4 is a plot 400 showing the multipath error envelope of Narrow and PAC correlators for 6 dB attenuation on multipath. As shown, PAC has superior performance compared to Narrow Correlator when multipath delay is beyond the PAC inner correlator spacing. There is, however, short range multipath error affecting the receiver. It has been determined that the adverse effects of multipath signal distortion on the early-minus-late measurements is substantially reduced by narrowing the delay spacing between the early and late versions of the PRN code.

Actual data measurements in different environments support the fact that the short multipath is a major issue for GNSS receivers, including those implementing prior correlator-based tracking methods. More specifically, the probability of having short range multipath rays with considerable power level affecting the operation of GNSS receiver is much higher than observing medium or long multipath paths.

SUMMARY

An aspect of the present disclosure is directed to a GNSS receiver structure providing multipath-error estimation and correction functionality. The structure operates to detect, calculate, and mitigate correlation-peak distortion due to multipath, thereby providing improved multipath mitigation performance compared to conventional correlator-based methods, particularly in short-range multipath situations. As a result, embodiments of the present disclosure can be used to mitigate deleterious multipath effects.

An exemplary embodiment of the present disclosure is directed to a GNSS-receiver multipath-correcting tracking loop structure including: (A) a code tracking loop configured as a delay lock loop (DLL), the code tracking loop including, (i) an integration unit, wherein the integration unit is operative to accumulate all the chip transitions of each PRN code of a received GNSS signal and produce a chip-edge accumulation (CEA), (ii) a code discriminator, (iii) a loop filter, (iv) a numerically controlled oscillator (NCO), and (v) a code generator; and (B) a multipath-error estimation and correction (MEC) module including, (i) a multipath correlator unit operative to receive the CEA from the integration unit and implement a monitoring correlator and a prompt correlator to monitor the distortion of the correlation peak and produce a monitoring correlator output, (ii) a normalizing unit operative to receive the monitoring correlator output and normalize it to the prompt correlator and thereby produce a normalized monitoring correlator output, (iii) a low pass filter operative to receive and filter the normalized monitoring correlator output, and (iv) a code multipath estimation unit operative to receive the normalized monitoring correlator output from the low pass filter, and to produce an estimate of multipath error.

For the embodiment of the GNSS tracking loop structure, the code tracking loop and carrier tracking loop can each have an update time defined as an epoch, and the code multipath correlator unit can accumulate the monitoring and prompt correlators over N epochs. The epoch is preferably between 10 and 20 ms inclusive of the end values, and N is preferably between 10 and 20 inclusive of the end values. The MEC module can further include (v) a code multipath detection unit operative to determine whether the multipath error signal exceeds a threshold value. For the GNSS tracking loop structure, the MEC module can further include a summer configured to subtract the multipath error estimate from range measurements and thereby produce corrected range measurements. For the GNSS tracking loop structure, the monitoring correlator can include a Blanked correlator. For the GNSS tracking loop structure, the monitoring correlator can include an early-minus-prompt EMP correlator. For the GNSS tracking loop structure, the monitoring correlator can include an early correlator. For the GNSS tracking loop structure, the code multipath error estimation unit can calculate multipath error (ME) according to the following:

$$ME = \left(\frac{M}{P} - \left\langle\frac{M}{P}\right\rangle\right) * k \text{ (chips)},$$

where M and P are Monitoring correlators and Punctual correlators, respectively, <M/P> is the mean value of M/P in a clean, no-distortion environment; and k is a gain parameter. For the GNSS tracking loop structure, the CEA based Punctual correlator can be constructed based on the following weighting: $w_P = [-1, -1, -1, -1, -1, -1, +1, +1, +1, +1, +1, +1]^T$. For the GNSS tracking loop structure, a value of k can be selected such that it minimizes the following: arg min (ME$-\widetilde{AME}$), where $\widetilde{AME}$ is a actual multipath error measured in a calibration process.

A further exemplary embodiment of the present disclosure is directed to a GNSS receiver including a plurality of channels, each channel including (A) a code tracking loop configured as a delay lock loop (DLL), the code tracking loop including, (i) an integration unit operative to accumulate all chip transitions of each PRN code of a received GNSS signal, (ii) a code discriminator, (iii) a loop filter, (iv) a numerically controlled oscillator (NCO), and (v) a code generator; and (B) a carrier tracking loop configured as a phase lock loop (PLL), the carrier tracking loop including, (i) an integration unit operative to accumulate a full PRN code of the received GNSS signal, (ii) a carrier discriminator, (iii) a loop filter, (iv) a numerically controlled oscillator (NCO), and (v) a carrier generator; and (C) a multipath-error estimation and correction (MEC) module including, (i) a multipath correlator unit operative to receive the CEA from the integration unit and implement a monitoring correlator and a prompt correlator to monitor the distortion of the correlation peak, where the code multipath correlator unit is operative to produce a monitoring correlator output, (ii) a normalizing unit operative to receive the monitoring correlator output and normalize it by the prompt correlator, and thereby produce a normalized monitoring correlator output, (iii) a low pass filter operative to receive and filter the normalized monitoring correlator output, and (iv) a code multipath estimation unit operative to receive the normalized monitoring correlator output from the low pass filter and to produce an estimate of multipath error.

For the embodiment of the GNSS receiver, the code tracking loop and carrier tracking loop can each have an update time defined as an epoch, and the code multipath correlator unit can accumulate the monitoring and prompt correlators over N epochs. The epoch is preferably between 10 and 20 ms inclusive of the end values, and N is preferably between 10 and 20 inclusive of the end values. The MEC module can further include (iv) a code multipath detection unit operative to determine whether the multipath error signal exceeds a threshold value. The GNSS receiver can further include a scaling function unit connected to the carrier tracking phase lock loop and the code tracking delay lock loop, and providing a scale factor (SF) to the code tracking delay lock loop, where the SF comprises a ratio of carrier frequency to the code chipping rate of the received GNSS signal. The GNSS receiver can be configured to receive GNSS satellite signals. For the GNSS receiver, the code multipath error unit can calculate multipath error (ME) according to the following:

$$ME_i = \left(\frac{M}{P_C}i - \left\langle\frac{M}{P_C}i\right\rangle\right) * k \text{ (chips)},$$

wherein, Pc is measured by a full PRN code correlator based on a punctual correlator utilizing the output of the carrier tracking loop integrator, and where $$\left\langle\frac{M}{P_C}i\right\rangle$$

is the mean value of $$\frac{M}{P_C}i$$

under a nominal no-mumpath condition for PRN i, and k is a gain parameter. For the GNSS receiver, the receiver can be configured to adaptively adjust the gain parameter k considering or based on a usage environment, e.g., the environment the receiver is used in or is intended to be used in.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all the components or steps that are described.

Figure 1:
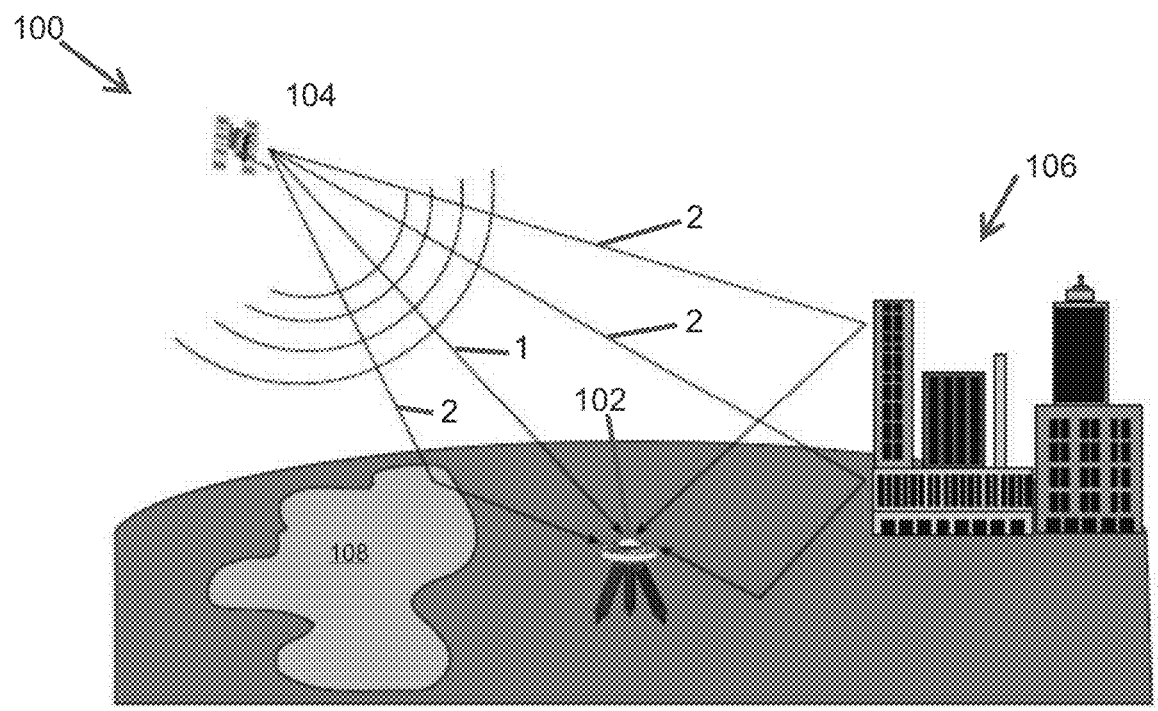
FIG. 1 depicts a diagram of direct and multipath signals received by a receiver.
Figure 2A:
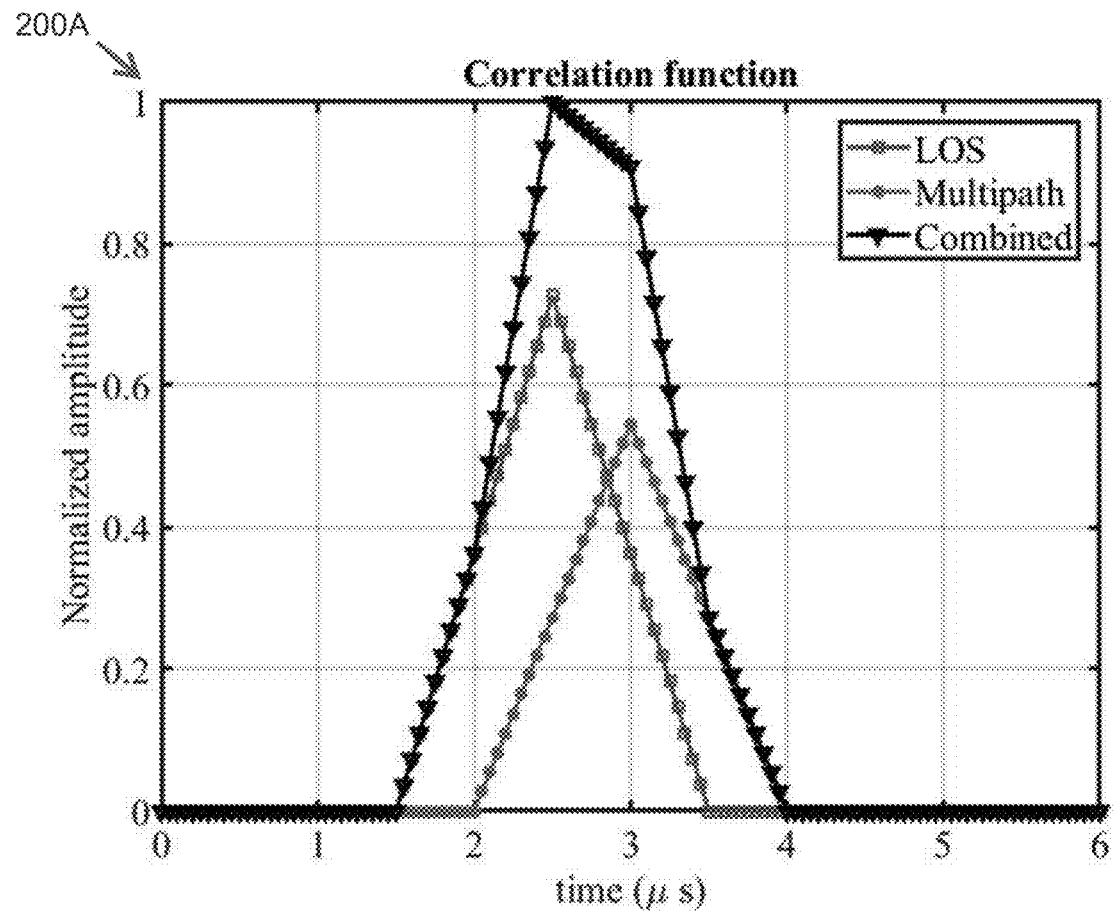
FIGS. 2A-2B depict direct path, multipath and resulting correlation functions for in-phase and out-of-phase scenarios, respectively.
Figures 2B, 3:
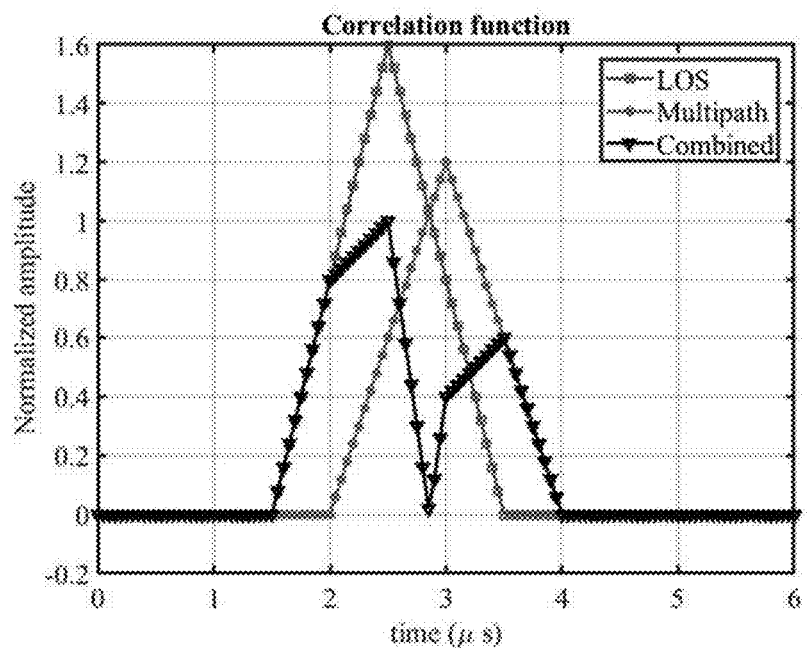
FIG. 3 depicts a graph of a correlation function including correlator layouts for Narrow correlators with different correlator spacing, and Pulse Aperture Correlator (PAC) techniques.
Figure 4:
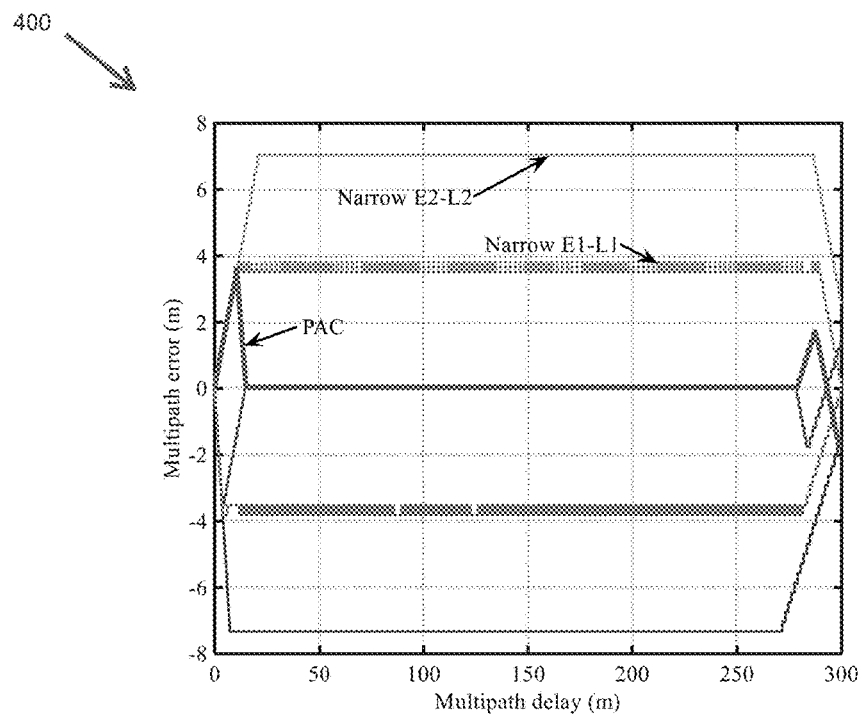
FIG. 4 depicts a graph showing multipath error envelopes for Narrow correlator, and PAC techniques.

As noted previously, multipath, causes distortion of the correlation (function) shape, e.g., as shown in FIGS. 2A-2B. This distortion is typically independent from PRN to PRN. An aspect of the present disclosure is directed to a GNSS receiver structure providing multipath-error estimation and correction functionality. The structure operates to detect, calculate, and mitigate correlation-peak distortion due to multipath, thereby providing improved multipath mitigation performance compared to conventional correlator-based methods, particularly in short-range multipath situations. As a result, embodiments of the present disclosure can be used to mitigate multipath effects.

Figure 5:
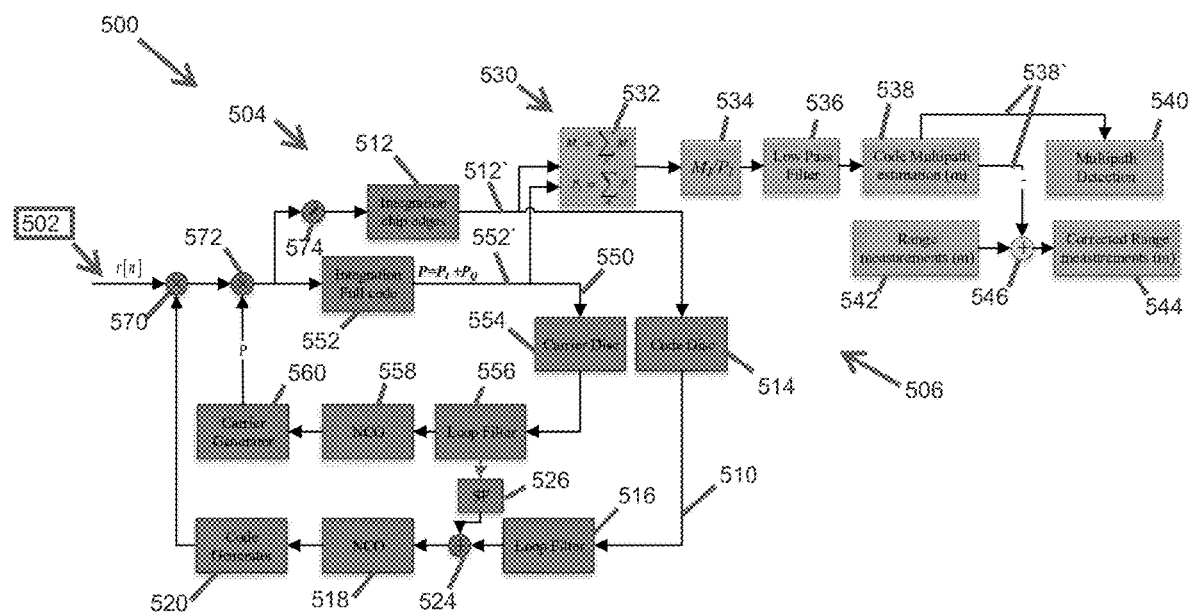
FIG. 5 depicts an example of a tracking loop and multipath detection and mitigation unit for use in a GNSS receiver, in accordance with the present disclosure.

Referring to FIG. 5, a GNSS receiver 500 is depicted, which employs a multipath-error estimation and correction (MEC) module, in accordance with the present disclosure. Receiver 500 receives satellite signals from an antenna 502, down-converts the signals in a downconverter (not shown) and samples the signals in a sampler (not shown) to produce I and Q signal samples in a known manner. The I and Q signal samples are supplied to a number of channels, a representative example of which is shown as 504; each channel is essentially identical except for the use of a different PRN code for each channel. These operations occur after the GNSS receiver 500 has performed its signal acquisition operations in a known manner, e.g., as discussed in U.S. Pat. Nos. 5,101,416; 5,390,207; 5,495,499; and, 6,243,409, each of which is incorporated herein by reference in its entirety.

The relevant operations of the GNSS receiver 500 in tracking the received code and carrier are provided below, without reference to the signal acquisition operations. Further, details of the code and carrier tracking operations that are unchanged by use of the multipath-error estimation and correction module are omitted for brevity. For example, details are omitted concerning how the receiver determines the Doppler shift and how it uses such information during carrier tracking operations. These carrier and code tracking operations, like the signal acquisition operations, are well known to those skilled in the art. Further, such carrier and code tracking operations are discussed in the above-referenced patents.

With continued reference to FIG. 5, GNSS receiver 500 includes a multipath-correcting tracking loop structure 506 that is used with the plurality of channels 504. Tracking loop structure 506 includes a delay lock loop (DLL) used for code tracking, also referred to as the "code tracking loop" 510, a multipath-error estimation and correction (MEC) module 530, and a phase lock loop (PLL) used for carrier tracking, also referred to as the "carrier tracking loop" 550. The MEC module 530 operates to estimate and correct distortion of a correlation function shape resulting from interference, e.g., due to multipath and/or other distortion sources such overlapped spoofing signals, jamming signals, and the like. GNSS receiver 500 can be of any type, e.g., GPS, GLONASS, Galileo, BeiDou, or the like. The code tracking loop 510 may or may not be assisted by the carrier tracking loop.

The code tracking loop 510 includes integrator 512, code discriminator 514, loop filter 516, numerically controlled oscillator (NCO) 518, and code generator 520 configured as a DLL, as shown. Code discriminator 514 includes correlators for monitoring a correlation function between locally-generated PRNs (generated by code generator 520) and PRNs of the signals received from a satellite. In operation, the code tracking loop 510 receives the down-converted signals and tracks the GNSS signal dynamics due to satellite and/or receiver motion. Code discriminator 514 preferably implements an Early-Minus-Late (EML) discriminator with a wide loop bandwidth (e.g., 0.5-2 Hz) in stand-alone mode or narrow bandwidth (e.g., 0.01-0.5 Hz) in PLL-assisted-DLL mode to track the signal dynamics of the received signal(s). Optional aiding unit 524 is indicated and may be used for carrier-assisted applications. Mixers/multipliers 570, 572, and 574 are also shown.

The MEC module 530 includes a code multipath correlator unit 532 for implementing a monitoring correlator, a normalizing unit 534, a low pass filter 536, and a code multipath estimation unit 538, as shown. The MEC module 530 also includes a multipath detection unit 540 that is operable to receive a multipath estimate from the code multipath estimation unit 538 and to determine whether multipath exists or is not present, e.g., when the multipath estimate exceeds a predefined or otherwise determined threshold.

The carrier tracking loop 550 includes integration unit 552, carrier discriminator 554, loop filter 556, numerically controlled oscillator (NCO) 558, and carrier generator 560 configured as a PLL, as shown. In preferred embodiments, the carrier tracking loop 550 assists the code tracking loop 510 by supplying a scaling factor (SF) by way of a scaling factor unit 526, which is connected to the code tracking loop 510 and the carrier tracking loop 550. The SF is preferably the ratio of carrier frequency of the GNSS signal to the code chipping rate of the PRN code. In static scenarios (e.g., with a stationary receiver and static reflecting surfaces), the effects due to multipath interference have much slower variations (e.g., a few mHz) compared to those of the signal dynamics (e.g., due to satellite movement). As such, the multipath effects can be assumed to be constant in each code-tracking loop-update interval (typically tens of ms). On the other hand, when the receiver is in motion or the reflective objects are moving, the effect of multipath is negligible due to the code tracking loop filtering. The DLL loop filter 516 preferably uses a loop filter with a relatively wide bandwidth, e.g., 0.1-1 Hz, in order to obtain the multipath error with a minimum of any latency. Since the multipath measurements are subject to noise, the monitoring correlator is preferably accumulated over a relatively long period, e.g., 0.1 to 0.5 s. Using such a long period is justified since the stationary multipath interference is slowly varying and can be assume constant during the observation interval. In exemplary embodiments, a Blanked correlator is used for the monitoring correlator, as described in further detail below.

MEC 530 includes and implements one or more monitoring correlators "M" (which are present in addition to those of the code tracking loop 510), which is/are used to estimate and detect the distortion of the correlation peak of the signal samples of the code tracking loop 510. Various correlator types can be used for multipath estimation including, but not limited to, Early correlator normalized to a Prompt (or, "Punctual") correlator, early-minus-prompt (EMP) correlator normalized to a Prompt correlator, and Blanked correlator normalized to a Prompt correlator. A Blanked correlator correlates signal samples (e.g., I and Q samples) with a code that is all zeros except for a fraction of a code chip that corresponds to the times of the bit transition (s) in the local PRN code. In exemplary embodiments, the monitoring correlator (e.g., implemented in the multipath correlator unit 532) is used to estimate the multipath error using a Blanked correlator, preferably with arbitrary correlator spacing of $d_1$, as referenced in FIG. 6, while the code tracking loop discriminator 514 preferably uses a narrow-correlator with arbitrary correlator spacing of $d_2$. In exemplary embodiments $d_1=d_2$. In exemplary embodiments, the multipath correlator unit 532 implements a Blanked correlator, as described in U.S. Pat. No. 6,243,409, which patent is assigned to the applicant of the present disclosure and incorporated by reference herein in its entirety.

Figure 6:
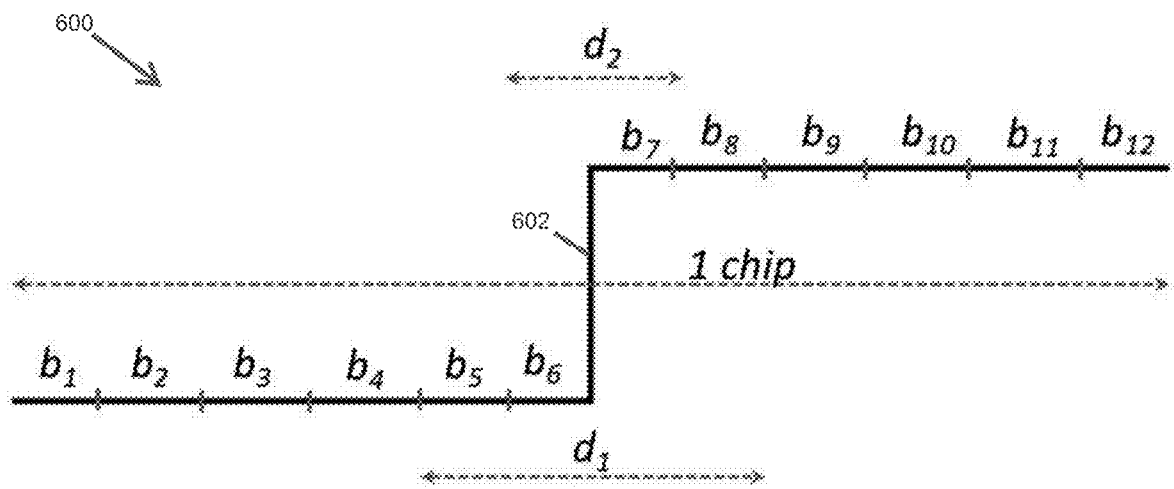
FIG. 6 shows a composite or average chip transition based on chip-edge-accumulation (CEA) as accumulated in an integrator for a representative PRN in accordance with the present disclosure.

FIG. 6 depicts a plot 600 showing a composite chip edge or chip transition 602 between two chips, based on all the chip edges of a PRN code as accumulated in an integrator, e.g., integrator 512, from a chip-edge accumulation (CEA) of a GNSS PRN code. The chip transition 602 shown is idealized for clarity in discussion and will normally deviate from that shape based on various operational/environmental factors, e.g., specific satellite and GPS receiving equipment used. Each chip edge or transition is fundamentally the same as the others in the absence of noise or other interference. The 1-to-0 transitions are identical to the 0-to-1 transitions except that they are inverted. As shown, an accumulated chip (accumulation over a span of one chip) can be divided into an arbitrary number of M bins, $b_m$, where m is the individual bin number from 1 to M, e.g., for M=12 bins. The width of each bin at negative and positive parts of the chip transition or bit edge 602, respectively, can be selected arbitrarily. Mirror bins at each side of the bit edge 602, however, preferably have the same width. For instance, $b_5$ and $b_6$ can have different width, however, $b_6$ and $b_7$, because they are on difference sides of the transition or bit edge, preferably have the same width. Using this configuration different correlators can be made using this accumulated chip shown in FIG. 6.

Referring now to both FIGS. 5 and 6, in operation of GNSS receiver 500, the integration unit 512 accumulates all the chip transitions of a PRN code in the received signal. For instance, GPS L1 C/A PRN 1 has 512 edges (transition from a 0 state to a 1 state or 1 state to a 0 state) out of 1023 chips. For this case, the receiver 500, by way of the integration unit 512, accumulates all 512-chip transitions to construct one chip transition 602 whereas unit 552 integrates all 1023 chips.

The outputs of code integration unit 512 and carrier integration unit 552 (512' and 552', respectively) can be used by multipath correlator unit 532 to form both a chip-edges based monitoring correlator (M) and a full-code correlator (P). These correlators (M and P) are accumulated, e.g., by the multipath correlator unit 532, over the tracking-loop update time of the respective tracking loops (510, 550). The respective tracking-loop update times are preferably the same, but they may differ. The tracking-loop update time can be defined or considered as an epoch, which is preferably within 1-20 ms. As the M and P correlators may be subject to significant noise, they are preferably accumulated for a longer time than a single epoch, e.g., over N epochs. The value of N may be somewhere between, e.g., 10 to 20, but other values can be used. Then, from the normalizing unit 534, the monitoring correlator output normalized by the punctual correlator ($M_I/P_I$) is fed to low-pass filter 536 for further smoothing. One of skill in the art will understand that while the drawing shows only subscripts for the in-phase (I) signal, this is done merely for clarity in the drawing, and the components in the MEC process the quadrature-phase (Q) signal as well. The code multipath estimation block 538 then implements EQ 13 to estimate the multipath error. At the multipath error detection unit 540, the estimated multipath error (ME) can be used to detect multipath interference if the error passes a pre-defined threshold. The multipath error (ME) can be used to correct range measurements. For example, a range measurements unit 542 can produce range measurements 542', which can have the estimated multipath error signal 538' subtracted at a summer 546. This process results in corrected range measurements 545 as shown.

In exemplary embodiments of the present disclosure, a code tracking loop, e.g., 510, can use a narrow correlator to track signals and update the tracking loop. For example, the tracking loop can utilize an early-minus-late correlator (EML) with correlator spacing of $d_1$ as constructed using the following:

$$EML = b^T w_{EL} \qquad (EQ. 4)$$

where $$b = [b_1, b_2, \ldots, b_{12}]^T$$

$$w_{EL} = [0,0,0,0,1,1,1,1,0,0,0,0]^T$$

where $w_{EL}$ is the weighting vector and T is the transpose operator.

For the MEC module 530, a monitoring correlator is used to monitor the distortion on the correlation function. In exemplary embodiments, a Blanked correlator can be used for the monitoring correlator, using a correlator spacing of $d_1$ correlator can constructed according to the following:

$$B = b^T w_B \qquad (EQ. 5)$$

where, $$b = [b_1, b_2, \ldots, b_{12}]^T \text{ and } w_B = [0,0,0,0,-1,-1,+1,+1,0,0,0,0]^T.$$

In other embodiments, an Early-Minus-Prompt (EMP) correlator can be used by MEC module 530 to monitor the distortion on the correlation function. For example, an EMP correlator can be constructed as follows:

$$EMP = b^T w_{EP} \qquad (EQ. 6)$$

where, $b=[b_1,b_2,\ldots,b_{12}]^T$ and $w_{EP}=[0,0,0,0,1,1,0,0,0,0,0,0]^T$.

In other embodiments, an Early (E) correlator can be used by MEC module 530 to monitor the distortion on the correlation function. For example, an Early (E) correlator can be constructed as follows:

$$E=b^T w_E \qquad (EQ.\ 7)$$

where, $b=[b_1,b_2,\ldots,b_{12}]^T$ and $w_E=[-1,-1,-1,-1,-1,+1,+1,+1,+1,+1,+1,+1]^T$.

In exemplary embodiments, the tracking correlators of the code tracking 510 loop and the correlator(s) of the MEC module 530 preferably have correlator spacings of $d_1 = d_2$, as described herein as; other spacings may be used, however, within the scope of the present disclosure. In exemplary embodiments, the weighting vector for a monitoring correlator can be configured to implement an Early Correlator or an Early-minus-Prompt (EMP).

In operation, the output of the normalized Blanked correlator—in which process the Blanked correlator output is normalized to the Punctual correlator (P) can be used to estimate and detect the multipath error. As shown in FIG. 5, normalizing unit 534 can provide the normalized monitoring correlator output value. To this end, a Punctual correlator (P) based on the accumulated chip transition shown in FIG. 6 can be constructed based on the following weighting:

$$w_P = [-1,-1,-1,-1,-1,-1,+1,+1,+1,+1,+1,+1]^T. \qquad (EQ.\ 8)$$

The multipath error (ME) can then be calculated according to the following:

$$ME = \left(\frac{M}{P} - \left\langle\frac{M}{P}\right\rangle\right) * k \qquad (EQ.\ 9)$$

where:

M is the monitoring correlator and P is the punctual, with both being based on CEA, $\left\langle\frac{M}{P}\right\rangle$ is the mean value of $\frac{M}{P}$ in clean, no-distortion environments; and k is the gain parameter, which can be tuned to change the sensitivity of MEC and optimize the multipath mitigation performance.

In exemplary embodiments, for EQ. 9, a value of k is chosen according to the following minimization statement:

$$\mathrm{argmin}(ME-\overline{AME}) \qquad (EQ.\ 10)$$

where $\overline{AME}$ is the actual multipath error, e.g., as measured in the calibration process. $\overline{AME}$ can be measured by knowing the locations of the receiver antenna and satellite and removing all corresponding errors including satellite and atmospheric errors from the pseudorange measurements. Ionosphere Free Code-minus-Carrier (IFCMC) can also be used to determine the magnitude of multipath error, and accordingly represent the $\overline{AME}$.

Figure 7:
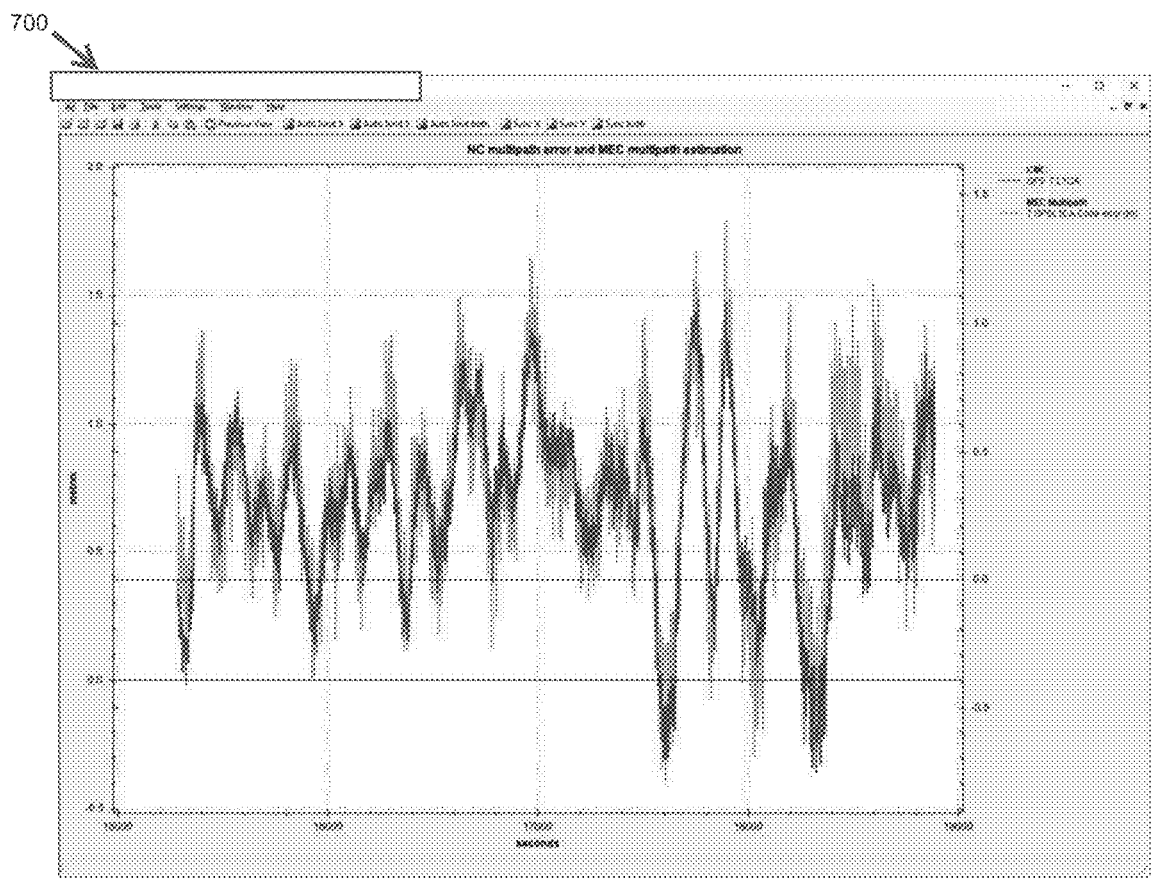
FIG. 7 shows a plot of Ionosphere Free Code-minus-Carrier (IFCMC) and multipath error (ME) for a given value of the gain parameter (k).

FIG. 7 shows a plot 700 of Ionosphere Free Code-minus-Carrier (IFCMC) and multipath error (ME) for a given value of the gain parameter (k). IFCMC can be used to determine the actual multipath error magnitude affecting range measurements. The IFCMC and ME are indicated for k=2.2. In the case shown, the ME estimated by MEC matches the magnitude of actual multipath error measured by IFCMC.

Unlike prior techniques, embodiments of the present disclosure utilize chip-edge-accumulation (CEA), which first accumulates all the chip edges in the code and operates based on the accumulated chip edges. In contrast, prior art techniques utilize accumulation based on the full code length.

In exemplary embodiments of the present disclosure, the code multipath error can be estimated (e.g., by the code multipath estimation unit 538) based on the following formula:

$$ME = \left(\frac{B}{P} - \left\langle\frac{B}{P}\right\rangle\right) * k \quad (chips), \qquad (EQ.\ 11)$$

where:

B and P are the Blanked and Punctual correlators, respectively;

$\left\langle\frac{B}{P}\right\rangle$

B and P are the Blanked and Punctual correlators, respectively;

$\frac{B}{P}$ is the mean value of in clean, no-distortion environments; and k is the gain parameter, which can be tuned to change the sensitivity of MEC and optimize the multipath mitigation performance.

The value of k (e.g., as indicated in EQ. 11) is preferably estimated (calculated) to minimize measurement error in a calibration process. More specifically, and in contrast with prior techniques, a cost function is defined to minimize the multipath error affecting the code measurement, e.g., as stated by EQ. 10. Moreover, k can be adaptively optimized based on a given propagation environment (e.g., for fixed antenna applications) for each specific PRN. As discussed above for FIG. 7, IFCMC can be used to determine the actual multipath error magnitude affecting range measurements. This can be used to update k to minimize the cost function.

In the case where a P correlator is not available using chip edge accumulation (CEA), other types of correlators may be used. For example, a punctual correlator based on the entire code length can be used, scaling it by the number of the edges that occur in each PRN code. Hence, the multipath error in such case for the $i^{th}$ PRN can be calculated by $$ME_i = \left(\frac{M}{Pc}i - \left\langle\frac{M}{Pc}i\right\rangle\right) * k \text{ (chips)}, \quad \text{(EQ. 12)}$$

where $$\left\langle\frac{M}{Pc}i\right\rangle$$

is the mean value of M/Pc i in clean no multipath environment. In this case as described here each PRN has a unique $$\left\langle\frac{M}{Pc}i\right\rangle.$$

Figure 8:
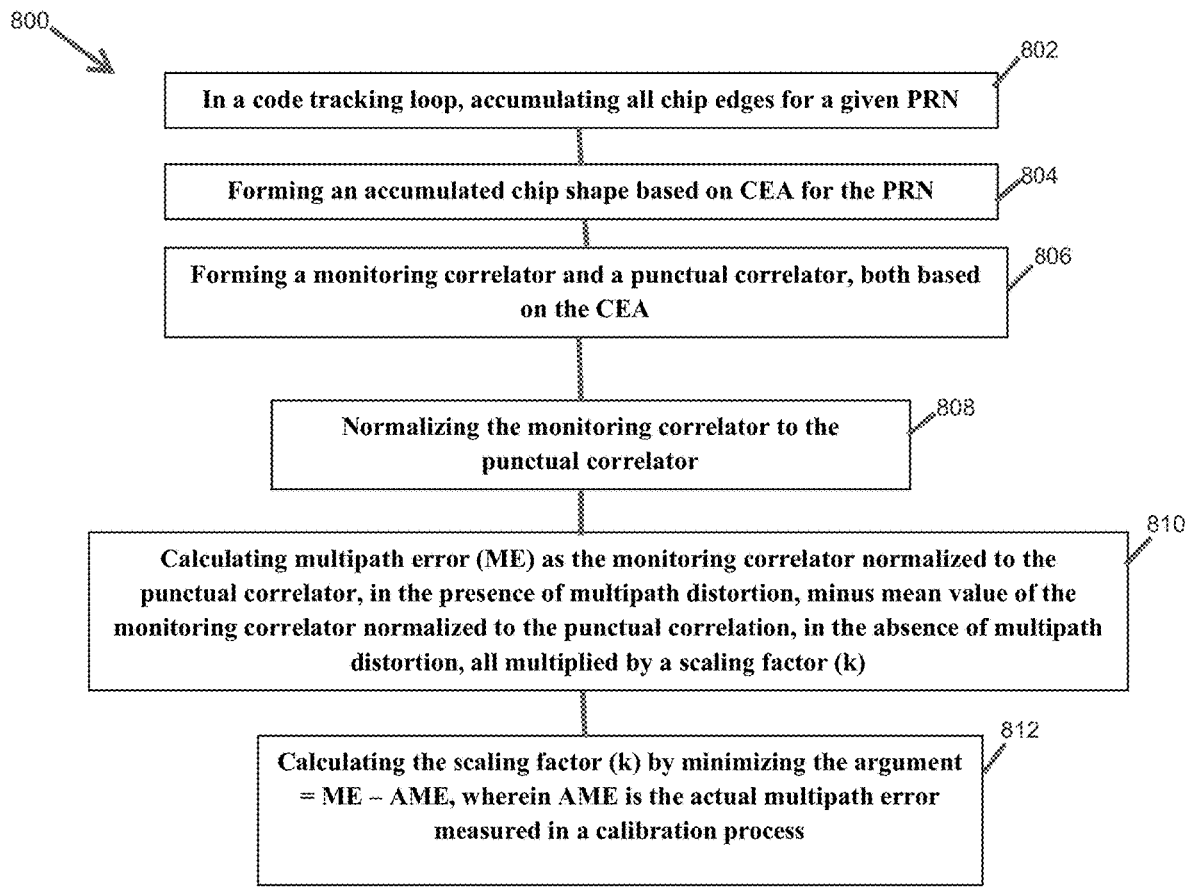
FIG. 8 is a box diagram depicting a method of estimating and correcting for multipath error, in accordance with exemplary embodiments of the present disclosure.

FIG. 8 depicts a block diagram of an example of a method 800 of estimating multipath error, in accordance with the present disclosure. In a code tracking loop, the chip-edge accumulation (CEA) of a PRN can be determined, as described at 802. An accumulated or averaged chip shape for the PRN can be formed, as described at 804. A monitoring and a punctual correlator can be formed, both based on the CEA, e.g., using EQ. 5, as described at 806. The monitoring correlator can be normalized by the punctual correlator, as described at 808.

With continued reference to FIG. 8, the multipath error (ME) can be calculated as the monitoring correlator normalized to the punctual correlator, in the presence of multipath distortion, minus the mean value of the monitoring correlator normalized to the punctual correlator, calculated in absence of multipath, all multiplied by the scaling or gain factor (k), as described at 810. The scaling or gain factor (k) can be calculated by minimizing the argument=ME−AME, where AME is the actual multipath error measured in a calibration process, as described at 812. One of skill in the art will understand that each block or step shown and described for FIG. 8 can be implemented in suitable code as computer-readable instructions resident or stored in suitable memory, e.g., within GNSS receiver 500. The instructions can be implemented by a suitable processor, e.g., resident in GNSS receiver 500, that is/are connected to the memory, and when executed by the processor cause the processor to perform the functions described and shown for FIG. 8.

Test Results of Implemented MEC embodiments:

Different test scenarios were used to characterize the performance of implemented MEC embodiments of the present disclosure compared to prior correlator techniques. These tests included roof-top data using low and high multipath antenna and hardware simulated data, as described in further detail below.

High multipath test results: In this test, two NovAtel receivers were used. One receiver was set with a default configuration a second receiver implemented an embodiment of the presently disclosed Multipath Error Correction (MEC) technique. Test results are shown in FIG. 9.

Figure 9:
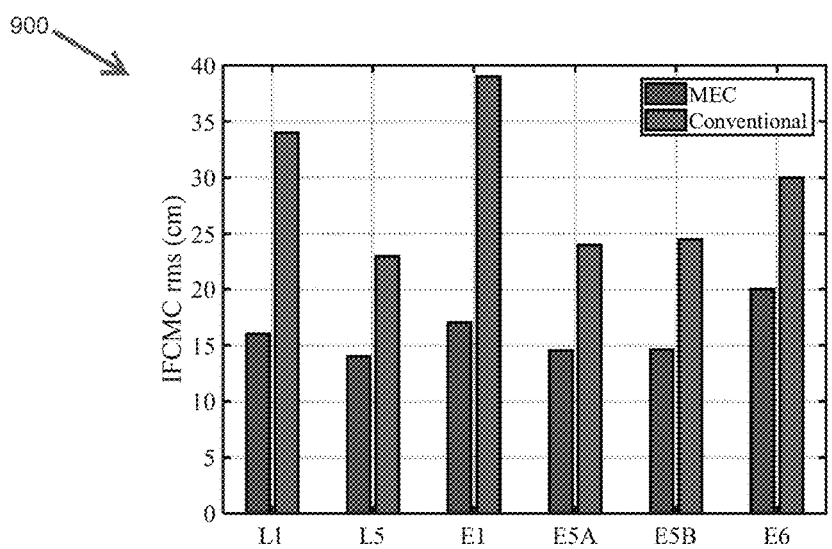
FIG. 9 is a bar graph depicting multipath error average RMS (cm) based on a Testing, Editing, and Quality Check (TEQC) metric for different GNSS receivers, a NovAtel OEM 7.07 FW implementing MEC, and a NovAtel OEM 7.07 FW implementing New Correlator Spacing (NCS), over a 24-hr data set.

FIG. 9 is a bar graph 900 depicting multipath error average RMS (cm) based on an Ionosphere Free Code-minus-Carrier (IFCMC) metric for a NovAtel OEM 7.07 FW and a NovAtel OEM 7.07 FW implementing MEC, over a 24-hr data set. Comparisons of the performance of the two receivers are shown for GPS Li C/A, and GPS L5 bands, as well as for Galileo E1, E5A, E5B, and E6 bands. As shown, the implemented MEC improved the multipath reduction in the case of GPS L1 C/A by more than 50% compared to the conventional approach.

Figure 10:
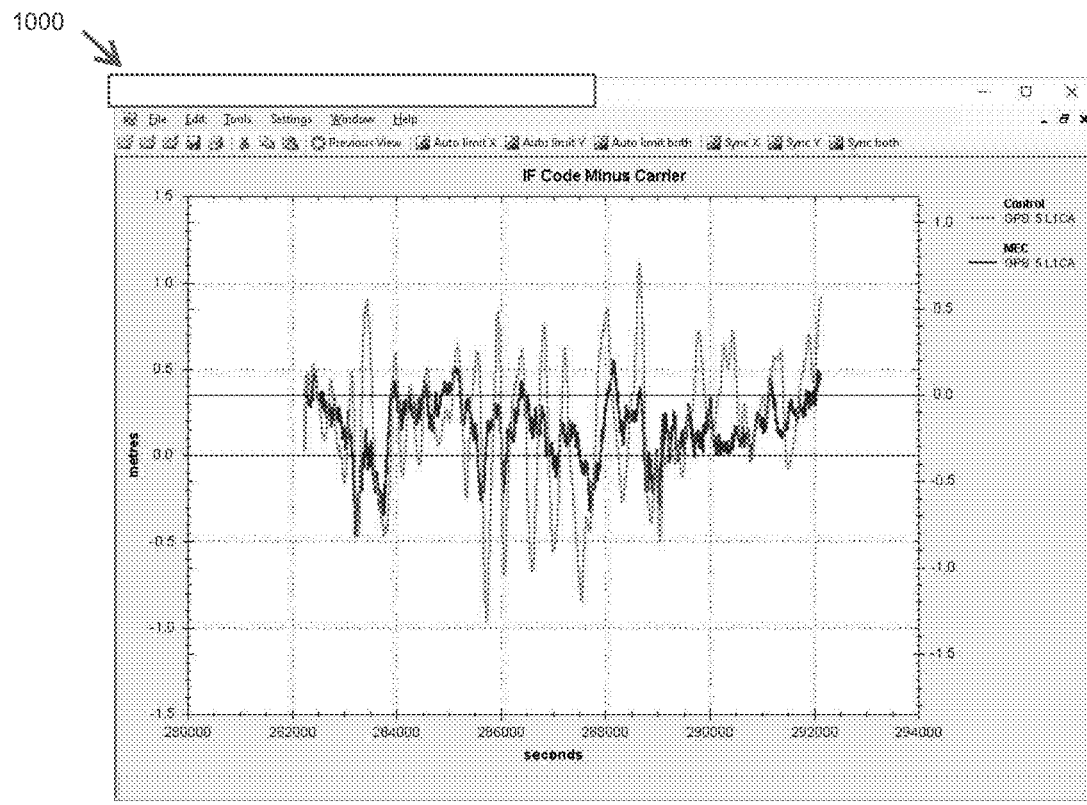
FIG. 10 is a plot showing the multipath-error mitigation performance of an implemented embodiment of multipath-error estimation and correction (MEC) compared to a narrow PAC (NPAC) for a first PRN.
Figure 11:
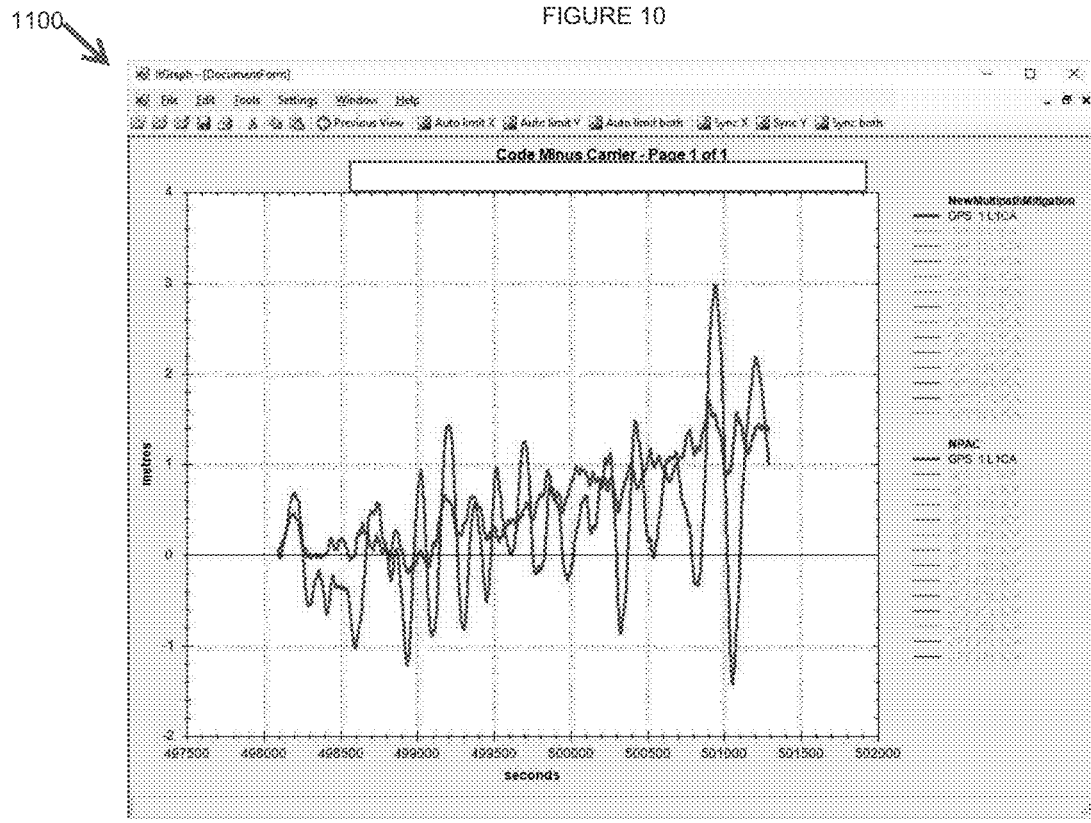
FIG. 11 is a plot showing the multipath-error mitigation performance of an implemented embodiment of multipath-error estimation and correction (MEC) compared to narrow PAC (NPAC) for a second PRN.

FIGS. 10 and 11 show time series of multipath error comparing the performance of multipath error correction (MEC) with PAC (PAC) for two different PRNs. FIG. 10 is a plot 1000 showing the multipath-error mitigation performance of an implemented embodiment of multipath-error estimation and correction (MEC) compared to a control technique, PAC, for PRN 5. FIG. 11 is a plot 1100 showing the multipath-error mitigation performance of an implemented embodiment of multipath-error estimation and correction (MEC) compared to PAC for PRN 1 of GPS L1CA signal.

Accordingly, from the foregoing description and accompanying drawings, one of skill in the art will appreciate that embodiments of the present disclosure can function to remove or reduce code multipath error and present demonstrable improvements compared to prior techniques. Embodiments of the present disclosure can be used to reduce or remove (depending on the multipath distance) code multipath error by implementing additional monitoring correlator structure in a multipath-error estimation and correction (MEC) module. The MEC module can include one or more correlators to detect and correct the correlation peak distortion. In exemplary embodiments, a code tracking loop integrates all-chip-edges of a PRN, and a narrow-correlator is used to update the tracking loop rate while a multipath estimation module implements a Blanked correlator to estimate and remove the multipath bias from the measurements. As a result, the code multipath mitigation performance is improved over the existing correlator-based methods, e.g., the Early-Minus-Late (EML), and Narrow Correlator, Pulse Aperture Correlator (PAC) techniques.

Unless otherwise indicated, the multipath-error estimation and correction units (MEC), code tracking loops, carrier tracking loops, and related structures that have been discussed herein are implemented with or as specially-configured computing, processing, or computer systems, e.g., a GNSS receivers, specifically configured to perform the functions that have been described herein for the component. Each computer system includes one or more processors, tangible memories (e.g., random access memories (RAMs), read-only memories (ROMs), and/or programmable read only memories (PROMS)), tangible storage devices (e.g., hard disk drives, CD/DVD drives, and/or flash memories), system buses, video processing components, graphics processing units (GPUs), network communication components, input/output ports, and/or user interface devices (e.g., keyboards, pointing devices, displays, microphones, sound reproduction systems, and/or touch screens).

Each computer system may include software (e.g., one or more operating systems, device drivers, application programs, and/or communication programs). When software is included, the software includes programming instructions and may include associated data and libraries. When included, the programming instructions are configured to implement one or more algorithms that implement one or more of the functions of the computer system, as recited herein. The description of each function that is performed by each computer system also constitutes a description of the algorithm(s) that performs that function.

The software may be stored on or in one or more non-transitory, tangible storage devices, such as one or more hard disk drives, CDs, DVDs, and/or flash memories. The software may be in source code and/or object code format. Associated data may be stored in any type of volatile and/or non-volatile memory. The software may be loaded into a non-transitory memory and executed by one or more processors.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and/or advantages. These also include embodiments in which the components and/or steps are arranged and/or ordered differently. For example, while the receivers above, e.g., as shown in and described for FIG. 5, have been described in the context of utilizing multiple channels, the scope of the present disclosure is not limited to such. In other embodiments, a single channel may be used for multiplexing receiver applications, in which the receiver includes an appropriate multiplexer.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All patents that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element proceeded by an "a" or an "an" does not, without further constraints, preclude the existence of additional elements of the identical type.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

What is claimed is:

1. A navigation receiver multipath-correcting tracking loop structure comprising:
   a processor coupled to a memory, the processor when executed configured to implement;
   (A) a code tracking loop configured as a delay lock loop (DLL), the code tracking loop including,
      (i) an integration unit, wherein the integration unit is operative to accumulate all chip transitions of a PRN code of a received navigation signal to produce a chip-edge accumulation (CEA),
      (ii) a code discriminator,
      (iii) a loop filter,
      (iv) a numerically controlled oscillator (NCO), and
      (v) a code generator; and
   (B) a multipath-error estimation and correction (MEC) module including,
      (i) a code multipath correlator unit operative to receive the CEA is from the integration unit and implement a monitoring correlator and a prompt correlator to monitor the distortion of a correlation peak and produce a monitoring correlator output,
      (ii) a normalizing unit operative to receive the monitoring correlator output and normalize the monitoring correlator output to the prompt correlator to produce a normalized monitoring correlator output,
      (iii) a low pass filter operative to receive and filter the normalized monitoring correlator output, and
      (iv) a code multipath estimation unit operative to receive the normalized monitoring correlator output from the low pass filter, and to produce an estimate of multipath error.

2. The navigation receiver multipath-correcting tracking loop structure of claim 1, wherein the code tracking loop and a carrier tracking loop each have an update time defined as an epoch, and wherein the code multipath correlator unit accumulates the monitoring and prompt correlators over N epochs, wherein N is a numerical value.

3. The navigation receiver multipath-correcting tracking loop structure of claim 2, wherein the epoch is between 10 and 20 ms inclusive of the end values, and wherein N is between 10 and 20 inclusive of the end values.

4. The navigation receiver multipath-correcting tracking loop structure of claim 1, wherein the MEC module further comprises (v) a code multipath detection unit operative to determine whether the multipath error signal exceeds a threshold value.

5. The navigation receiver multipath-correcting tracking loop structure of claim 1, wherein the MEC module further comprises a summer configured to subtract the multipath error estimate from range measurements and thereby produce corrected range measurements.

6. The navigation receiver multipath-correcting tracking loop structure of claim 1, wherein the monitoring correlator comprises a Blanked correlator.

7. The navigation receiver multipath-correcting tracking loop structure of claim 1, wherein the monitoring correlator comprises an early-minus-prompt (EMP) correlator.

8. The navigation receiver multipath-correcting tracking loop structure of claim 1, wherein the monitoring correlator comprises an early correlator.

9. The navigation receiver multipath-correcting tracking loop structure of claim 1, wherein the code multipath estimation unit calculates multipath error (ME) according to the following:

$$ME = \left(\frac{M}{P} - \left\langle\frac{M}{P}\right\rangle\right) * k \text{ (chips)},$$

wherein,

M is a monitoring output of the monitoring correlator and P is a prompt output of the prompt correlator, $$\left\langle\frac{M}{P}\right\rangle$$

is the mean value of $$\frac{M}{P}$$

in a clean, no-distortion environment; and k is a gain parameter.

10. The navigation receiver multipath-correcting tracking loop structure of claim 9, wherein the prompt correlator is constructed based on the following weighting:

$$w_P = [-1,-1,-1,-1,-1,-1,+1,+1,+1,+1,+1,+1]^T$$

11. The navigation receiver multipath-correcting tracking loop structure of claim 9, wherein a value of k minimizes the following:

$$\text{argmin}(ME - \widehat{AME}),$$

where $\widehat{AME}$ is a multipath error measured in a calibration process.

12. A navigation receiver comprising:
a processor coupled to a memory, the processor when executed configured to implement:
(A) a code tracking loop configured as a delay lock loop (DLL), the code tracking loop including,
 (i) a code tracking loop integration unit operative to accumulate all chip transitions of a PRN code of a received navigation signal to generate a chip-edge accumulation (CEA),
 (ii) a code discriminator,
 (iii) a loop filter,
 (iv) a numerically controlled oscillator (NCO), and
 (v) a code generator; and
(B) a carrier tracking loop configured as a phase lock loop (PLL), the carrier tracking loop including,
 (i) a carrier tracking loop integration unit operative to accumulate a full PRN code of the received navigation signal,
 (ii) a carrier discriminator,
 (iii) a loop filter,
 (iv) a numerically controlled oscillator (NCO), and
 (v) a carrier generator; and
(C) a multipath-error estimation and correction (MEC) module including,
 (i) a code multipath correlator unit operative to receive the CEA from the integration unit and implement a monitoring correlator and a prompt correlator to monitor the distortion of a correlation peak, wherein the code multipath correlator unit is operative to produce a monitoring correlator output,
 (ii) a normalizing unit operative to receive the monitoring correlator output and normalize the monitoring correlator output to the prompt correlator, and thereby produce a normalized monitoring correlator output,
 (iii) a low pass filter operative to receive and filter the normalized monitoring correlator output, and
 (iv) a code multipath estimation unit operative to receive the normalized monitoring correlator output from the low pass filter and to produce an estimate of multipath error.

13. The navigation receiver of claim 12, wherein the code tracking loop and carrier tracking loop each have an update time defined as an epoch, and wherein the code multipath correlator unit accumulates the monitoring and prompt correlators over N epochs, wherein N is a numerical value.

14. The navigation receiver of claim 12, wherein the epoch is between 10 and 20 ms inclusive of the end values, and wherein N is a numerical value between 10 and 20 inclusive of the end values.

15. The navigation receiver of claim 12, wherein the MEC module further comprises (iv) a code multipath detection unit operative to determine whether a multipath error signal exceeds a threshold value.

16. The navigation receiver of claim 12, further comprising a scaling function unit connected to the carrier tracking loop and the code tracking loop, and providing a scale factor (SF) to the code tracking loop, wherein the SF comprises a ratio of carrier frequency to a code chipping rate of the received navigation signal.

17. The navigation receiver of claim 12, wherein the receiver is a Global Navigation Satellite System (GNSS) receiver, wherein the GNSS receiver further comprises an antenna configured to receive the navigation signal that is a GNSS satellite signal.

18. The navigation receiver of claim 12, wherein the code multipath unit calculates multipath error (ME) according to the following:

$$ME_i = \left(\frac{M}{P_C}i - \left\langle\frac{M}{P_C}i\right\rangle\right) * k \text{ (chips)},$$

wherein,

Pc is measured by a full PRN code correlator based on the prompt correlator utilizing output of the carrier tracking loop integrator, M is a monitoring output of the monitoring correlator, $$\left\langle\frac{M}{P_C}i\right\rangle$$

is the mean value of $$\frac{M}{P_C}i$$

under a nominal no-multipath condition for PRN i, and k is a gain parameter.

19. The receiver of claim 18, wherein the gain parameter k is adaptively adjusted based on a usage environment.

20. A navigation receiver, comprising
a processor configured to:
- accumulate all chip transitions of a local code of a received navigation signal to produce a chip-edge accumulation (CEA); and
- implement, utilizing the CEA, a monitoring correlator and a prompt correlator to monitor the distortion of a correlation peak and produce a monitoring correlator output; and
- normalize the monitoring correlator output to the prompt correlator to produce a normalized monitoring correlator output; and generate an estimate of multipath error utilizing the normalized monitoring correlator output.

* * * * *